United States Patent
Yao

(10) Patent No.: US 8,061,674 B2
(45) Date of Patent: *Nov. 22, 2011

(54) PORTABLE APPARATUS AND FASTENING DEVICE THEREOF

(75) Inventor: Guo-Ping Yao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 130 days.

This patent is subject to a terminal disclaimer.

(21) Appl. No.: 12/512,997

(22) Filed: Jul. 31, 2009

(65) Prior Publication Data
US 2010/0043503 A1 Feb. 25, 2010

(30) Foreign Application Priority Data
Aug. 22, 2008 (CN) .......................... 2008 1 0304155

(51) Int. Cl.
*A47B 91/00* (2006.01)

(52) U.S. Cl. ........... 248/346.04; 248/346.01; 361/679.3; 361/679.41; 361/679.43

(58) Field of Classification Search .................. 248/686, 248/188.1, 346.01, 346.03, 346.04, 346.06, 248/346.5, 349.1; 361/679.3, 679.17, 679.41, 361/679.43, 679.55
See application file for complete search history.

(56) References Cited

U.S. PATENT DOCUMENTS

| | | | | | |
|---|---|---|---|---|---|
| 5,519,570 | A | * | 5/1996 | Chung | 361/679.17 |
| 6,029,940 | A | * | 2/2000 | Klein | 248/346.04 |
| 6,556,436 | B2 | * | 4/2003 | Ohnishi | 361/679.43 |
| 7,252,350 | B2 | * | 8/2007 | Chen et al. | 312/223.2 |
| 7,379,295 | B2 | * | 5/2008 | Ke | 361/679.41 |
| 7,532,466 | B2 | * | 5/2009 | Kobayashi et al. | 361/679.41 |
| 7,633,750 | B2 | * | 12/2009 | Fan et al. | 361/679.43 |
| 7,762,505 | B2 | * | 7/2010 | Muller | 248/187.1 |
| 2004/0061996 | A1 | * | 4/2004 | Kamphuis et al. | 361/683 |
| 2004/0145864 | A1 | * | 7/2004 | Usui et al. | 361/683 |
| 2005/0098700 | A1 | * | 5/2005 | Tien et al. | 248/346.01 |
| 2007/0177347 | A1 | * | 8/2007 | Nishiyama | 361/686 |
| 2007/0297130 | A1 | * | 12/2007 | Fan et al. | 361/686 |

FOREIGN PATENT DOCUMENTS
CN 101105981 A 1/2008
* cited by examiner

*Primary Examiner* — Terrell McKinnon
*Assistant Examiner* — Bradley Duckworth
(74) *Attorney, Agent, or Firm* — Atlis Law Group, Inc.

(57) ABSTRACT

A fastening device for fixing an electronic device includes a base board; a hook fixed on the base board and capable of inserting into the electronic device; a locking member attached on the base board, the locking member is rotatable in a first rotating plane; an actuating member attached on the base board and adjacent to the locking member, and a resilient member comprising two ends and a winding connecting with the two ends. The actuating member is rotatable between a first position and a second position in a second rotating plane, which is perpendicular to the first rotating plane. The actuating member contacting with the locking member. One of the two ends fixed on the actuating member, and the other one of the two ends fixed on the baseboard. The winding unrestrained disposed by the two ends.

19 Claims, 8 Drawing Sheets

PORTABLE APPARATUS AND FASTENING DEVICE THEREOF

BACKGROUND

This application is related to copending U.S. patent applications Ser. No. 12/512,998 filed Jul. 31, 2009 entitled "PORTABLE APPARATUS AND FASTENING DEVICE THEREOF" and Ser. No. 12/512,996 filed Jul. 31, 2009 entitled "PORTABLE APPARATUS AND FASTENING DEVICE THEREOF". The disclosures of the above-identified applications are incorporated herein by reference.

1. Technical Field

The present disclosure relates to portable apparatuses, and more particularly to a fastening device for fastening a portable apparatus to an object.

2. Description of Related Art

Portable electronic devices, such as handheld flat screen televisions and portable disc players, are widely used because of small sizes. Users may carry their portable electronic devices when travelling for business or entertainment. However, the users may have to hold the portable electronic devices in their hands or on their thighs or on a flat surface of the vehicle they are travelling in. After a period of time, the users' hands or thighs may become tired or the electronic devices may fall off the table due to the vehicle turning or bumps in the road.

Therefore, a need exits for providing a fastening device that the electronic device can be secured thereof.

DETAILED DESCRIPTION

Figure 1:
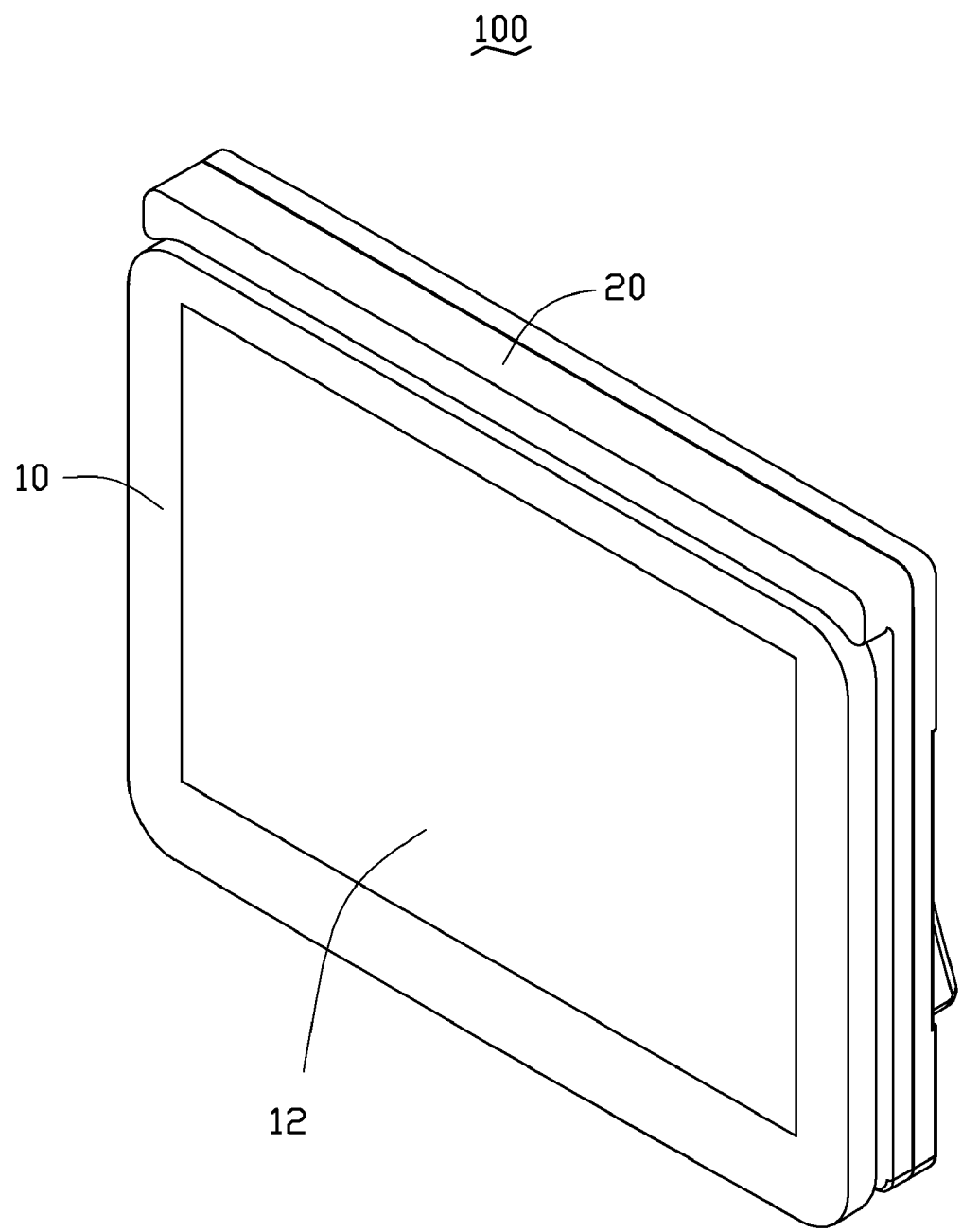
FIG. 1 is an isometric view of an electronic device, comprising a fastening device and an electronic device fixed thereon, in accordance with an exemplary embodiment.
Figure 2:
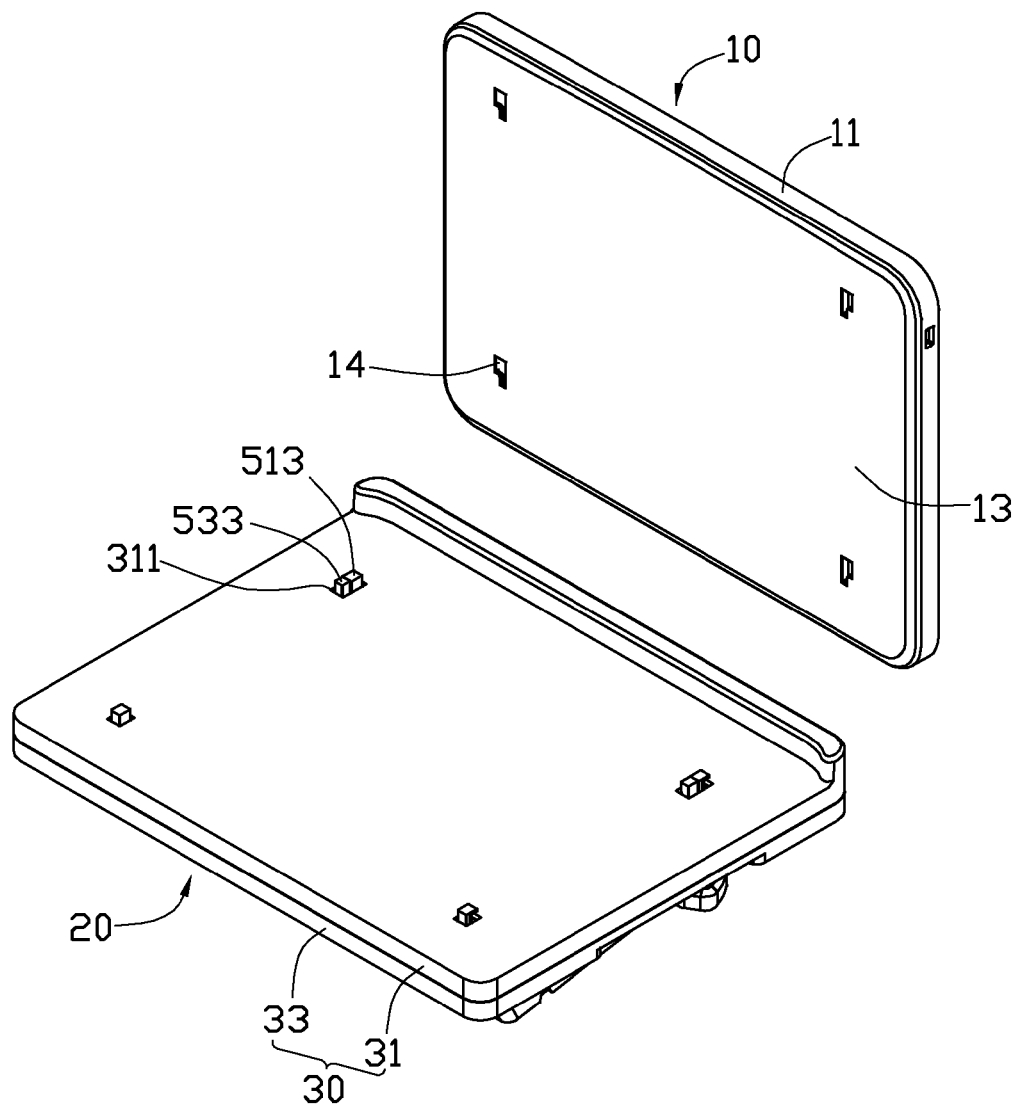
FIG. 2 is an exploded, isometric view of the electronic device of FIG. 1.

Referring to FIGS. 1 and 2, a portable apparatus 100 includes an electronic device 10 and a fastening device 20 detachably attached to the electronic device 10 for positioning the electronic device 10 to another object (not shown). The electronic device 10 may be a handheld flat screen television, a portable disc player, and so on.

The electronic device 10 is substantially rectangular-shaped, and includes a front casing 11 and a rear casing 13. The front casing 11 engages with the rear casing 13 to define a first receiving space. Components of the electronic device, such as a display module (not shown) may be disposed in the first receiving space. The front casing 11 may have a viewing surface. The electronic device 10 further defines four locking slots 14 in an outer surface of the rear casing 13. The four locking slots 14 are located in the vicinity of four corners of the rear casing 13 correspondingly.

Figure 3:
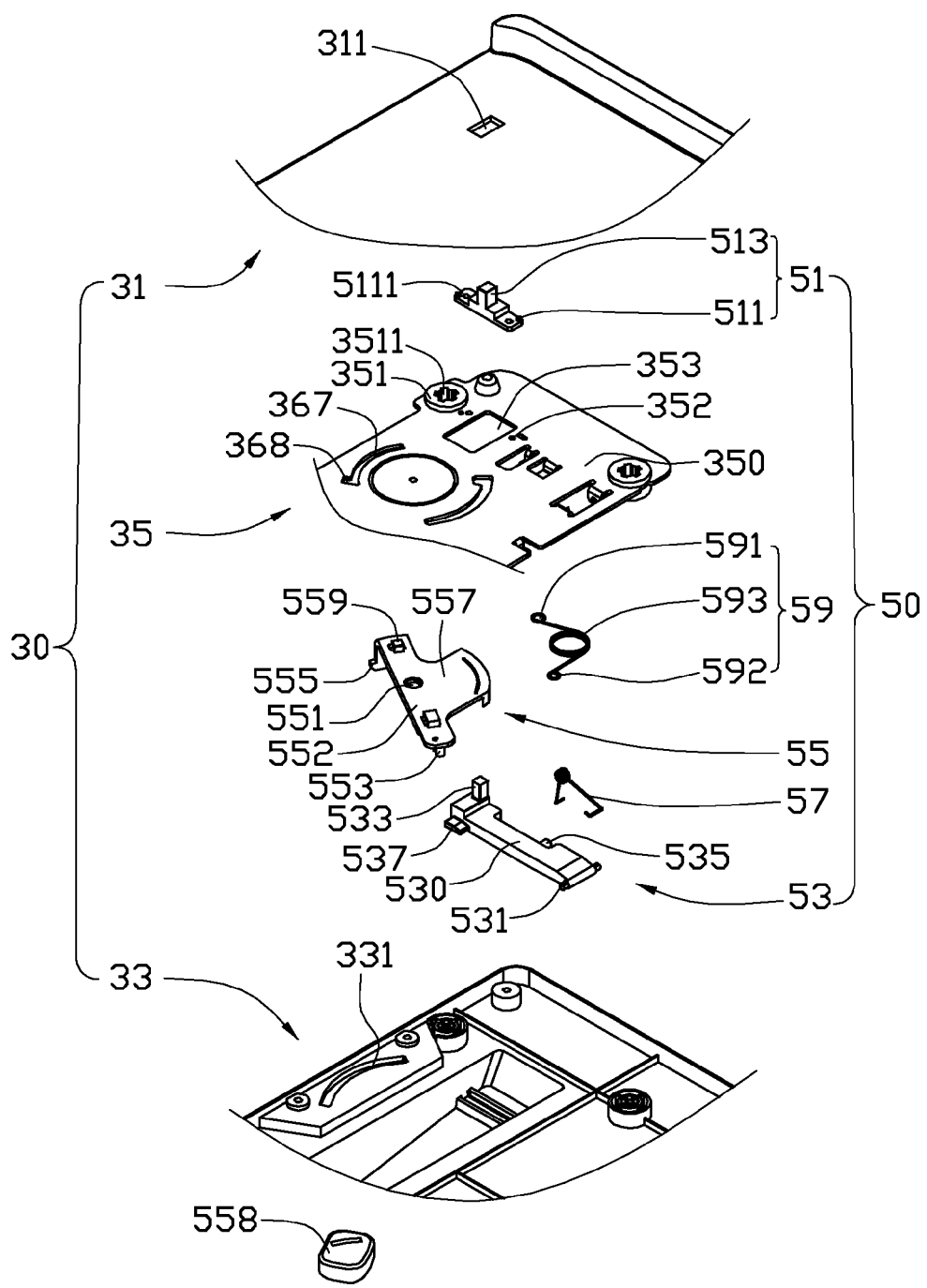
FIG. 3 is a partial exploded, isometric view of the fastening device of FIG. 2.
Figure 4:
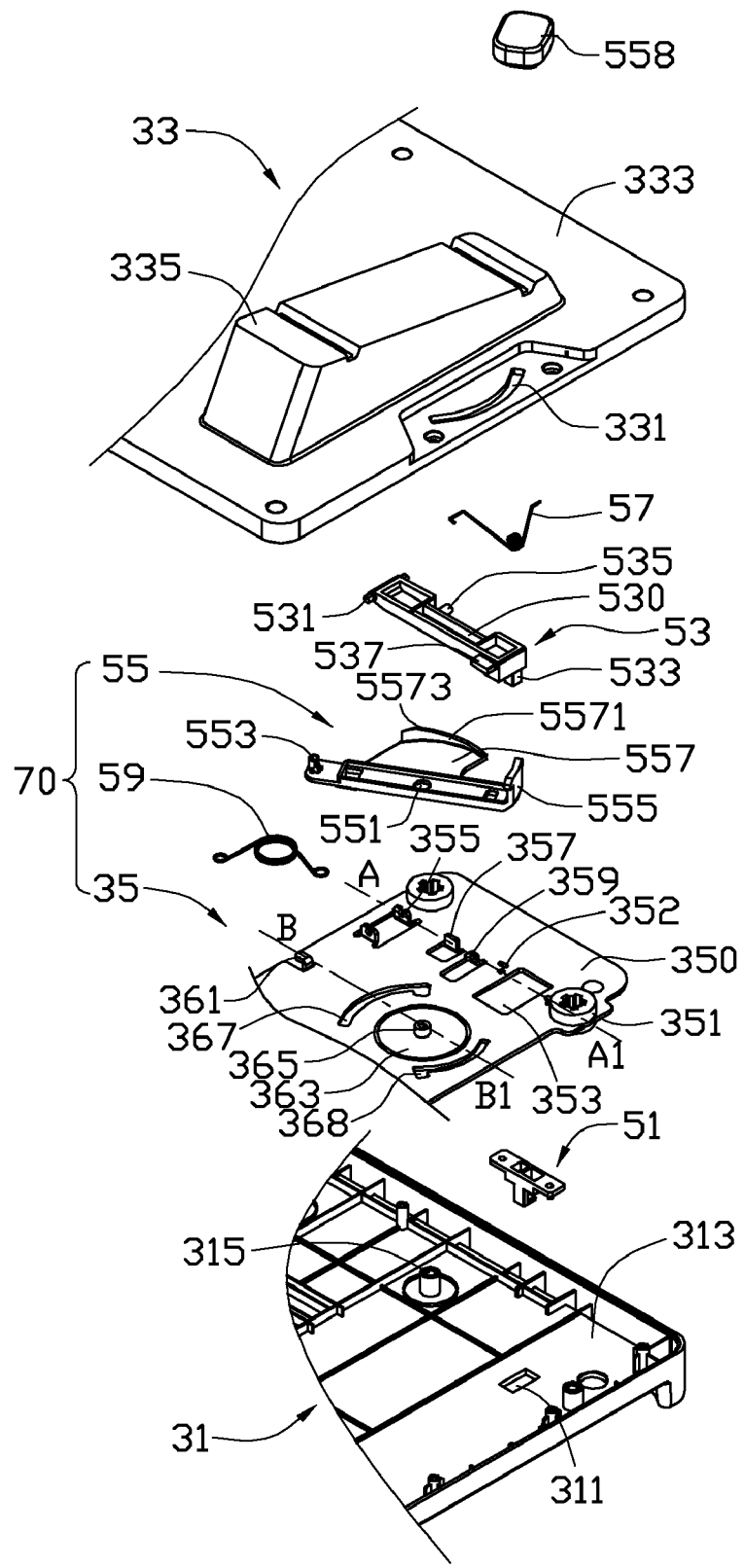
FIG. 4 is a reverse exploded, isometric view of FIG. 3.

Referring to FIGS. 2, 3, and 4, the fastening device 20 includes a cover 30, two locking mechanisms 50 are disposed in the cover 30.

The cover 30 includes a platform cover 31, a support cover 33 engaged with the platform cover 31, and a fixing member 35 disposed between the platform cover 31 and a support cover 33. The platform cover 31 supports the rear casing 13 of the electronic device 10 when the fastening device 20 is attached to the electrical device 10.

The platform cover 31 includes an outer platform surface 312 and an inner platform surface 313. The platform cover 31 defines four first through holes 311, the four first through holes 311 communicate between the outer platform surface 312 and the inner platform surface 313 of the platform cover 31. The openings 311 may locate at four corners of the platform cover 31 correspondingly. The four first through holes 311 correspond with the four locking slots 14 of the electrical device 10. A plurality of fixing posts 315 protrude from the inner platform surface 313 correspondingly.

The support cover 33 includes an inner support surface 332 and an outer support surface 333 on opposite sides of the support cover 33. The inner surface 332 faces the platform cover 31. Two guiding slots 331 are defined in the support cover 33 communicating between the inner surface 332 and the outer surface 333. The two pushing slots 331 are arc-shaped. The two pushing slots 331 are substantially located near shorter edges of the support cover 33 correspondingly. Two supporting portions 335 protrude from the outer surface 333. The two supporting portions 335 are adjacent to the two pushing slots 331, and are used for contacting with an object which the electronic device 10 is fastened on.

The fixing member 35 is substantially rectangular-shaped. The fixing member 35 may include a chassis 350, and four dampening members 351. The four dampening members 351 are fixed at four corners of the chassis 350 correspondingly. A fixing hole 3511 is defined in each dampening member 31, and used for the fixing post 315 to pass through, such that the fixing member 35 can be elastically fixed on the platform cover 31.

A positioning block 355, a stopping block 357, a first paw 359, a second paw 361, and a chassis platform 363 protrude from the chassis 350. The positioning block 355, the stopping block 357, and the first paw 359 are aligned along a first line AA1, with the stopping block 357 located between the positioning block 355 and the first paw 359.

Two mounting holes 352 and a opening 353 are defined in the chassis 350. The opening 353 is located between the two mounting holes 352. The first line AA1 passes through the two mounting holes 352 and the opening 353.

Figure 5:
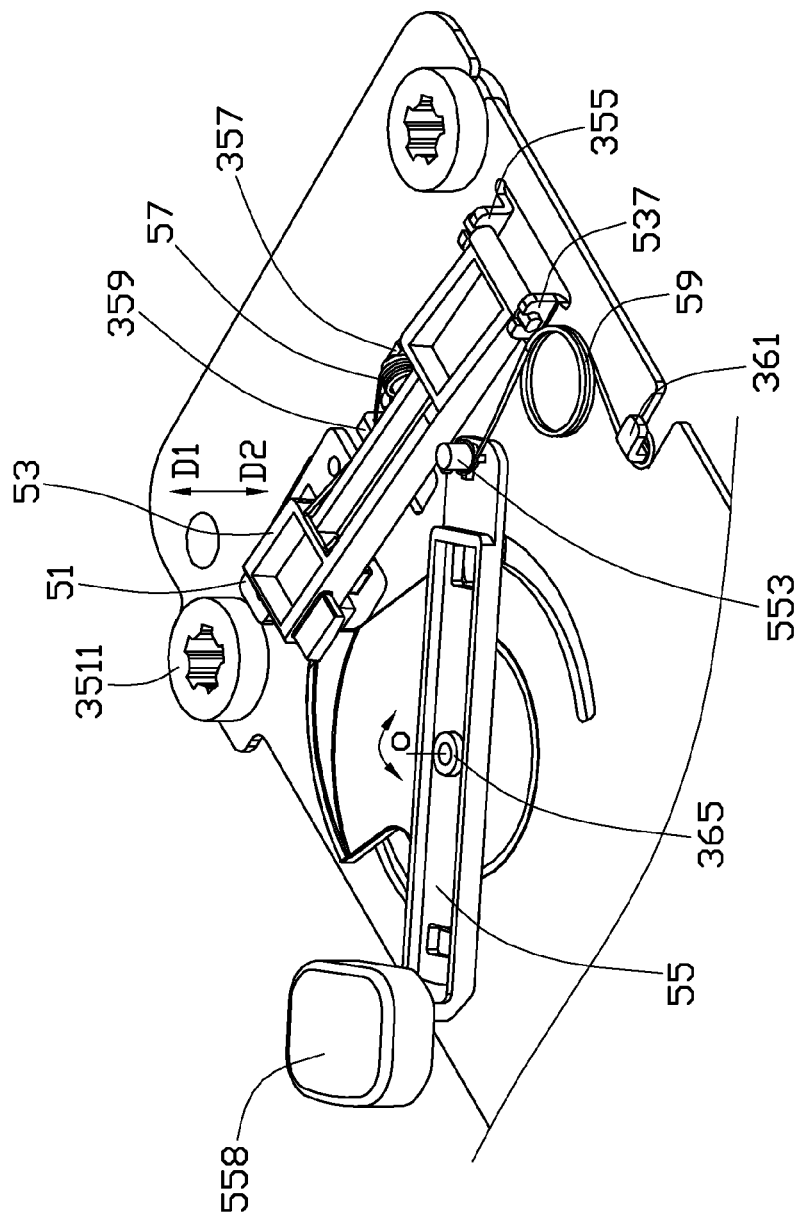
FIG. 5 is an isometric view of FIG. 4, but without the cover.

A positioning post 365 protrudes from the center of the chassis platform 363. The positioning post 365 and the second paw 361 are arranged in a second line BB1, and the positioning post 365 is located in a rotating center O of an actuating member 55 (FIG. 5). Two sliding slots 367 and two entrances 368 are defined in the chassis 350. Each of the two sliding slots 367 is substantially a quarter circle arc-shaped and arranged in a same circle, the center of which is the rotating center O of the actuating member 55. One of the two sliding slots 367 is located between the second paw 361 and the positioning post 365, and the second line BB1 extends through the center of the two sliding slots 367. The two entrances 368 communicate with the two sliding slots 367 correspondingly, and located at one end of the sliding slots 367 correspondingly.

Each of the locking mechanisms 50 includes a hook 51, a locking member 53, the actuating member 55, a first resilient member 59 and a second resilient member 57. The actuating member 55, the first resilient member 59, and the fixing member 35 constitute a rotating system 70.

The hook 51 is fixed on the chassis 350 of the fixing member 35, and is used for latching onto the electronic device 10. The hook 51 includes a fastening portion 511 and a hooking portion 513 disposed on the fastening portion 511. The fastening portion 511 defines two fastening holes 5111 corresponding to the two mounting holes 352 defined in the chassis 350. Thus, the hook 51 may be fastened on the fixing member 35 via a screw, a bolt, and so on. The hooking portion 513 is capable of passing through the through hole 311 and insertable into the locking slot 14 to hook on the electronic device 10.

The actuating member 55 may be an integrated member. The actuating member 55 includes a positioning portion 552, a driving portion 5571, and a connecting portion 557 connecting the driving portion 5571 to one side of the positioning portion 552. The positioning portion 552 is elongated, and includes a positioning hole 551, two hook-shaped claws 559, an actuating portion 555, a post 553, and a button 558. The positioning hole 551 is defined in the middle of the positioning portion 552. The positioning hole 551 is used for receiving the positioning post 365; therefore, the actuating member 55 is rotatably attached on the chassis platform 363 of the fixing member 35, and pivotally rotatable around the rotating center O.

The two hook-shaped claws 559 are disposed at opposite ends of the positioning portion 552 correspondingly. The claws 559 face the fixing member 35 corresponding to the sliding slots 367. The two claws 559 are installed into the sliding slots 367 from the entrances 368 and slidably clasp the fixing member 35, in order to prevent the actuating member 55 from disengaging with the fixing member 35 when rotated.

The actuating portion 555 and the post 553 are also disposed at opposite ends of the positioning portion 552, but face the support cover 33, and opposite to the two claws 559. The actuating portion 555 bends perpendicularly from one end of the positioning portion 552. The button 558 is located on the outer surface 333 of the support cover 33. The button 558 is fixable on the actuating portion 555 after the actuating portion 555 pass through the corresponding pushing slot 331, in order to be conveniently pushed by a user.

The connecting portion 557 is flat shaped. The connecting portion 557 extends from one side of the positioning portion 552 along an elongating direction, and parallel with the fixing member 35. The driving portion 5571 is an arc-shaped wall vertically extending from an edge of the connecting portion 557. The center of driving portion 5571 is the rotating center O of the actuating member 55. A height of the driving portion 5571 gradually decreases along a clockwise rotating direction of the actuating member 55 in FIG. 4. The driving portion 5571 includes a driving surface 5573 which is a top surface of the driving portion 5571. The driving surface 5573 is an inclined surface with respect to the plane of the rotating surface of actuating member 55.

The first resilient member 59 is a torsion spring, and includes a first end 591, a second end 592, and a winding 593 connecting the first end 591 and the second end 592. The first end 591 is fixed on the post 553, and the second end 592 is fixed on the second paw 361. The winding 593 is freely disposed between the post 553 and the second paw 361. Therefore, the first resilient member 59 provides a torsional force to limit the actuating member 55 located at two ends of the sliding slots 367.

The locking member 53 is substantially elongated, and pivotally attached on the fixing member 35. The locking member 53 includes a base 530, a shaft 531, a locking portion 533, a driven portion 537, and a post 535. The shaft 531 and the locking portion 533 are disposed at opposite ends of the base 530 correspondingly. The shaft 531 is pivotally fixed on the positioning block 355, in order to pivotally fix the locking member 53 on the fixing member 35.

The locking portion 533 is a protruding block and faces the fixing member 35. The locking portion 533 is used for passing through the opening 353 and the through hole 311, and inserting into the rest space of the corresponding locking slot 14 of the electronic device 10, to prevent the hooking portion 513 from drawing from the locking slot 14. The post 535 protrudes from a side surface of the locking member 53 adjacent to the shaft 531, and faces the stopping block 357.

The driven portion 537 is contacting with the driving portion 5571 The driven portion 537 may be a protruding block opposite to the post 535 and adjacent to the locking portion 533. The driven portion 537 is supported on the driving surface 5573, thus, the driven portion 537 may be pushed to move toward a first direction D1 and a second direction D2 (FIG. 5), when the actuating member 55 is actuated. The first direction D1 is a reverse direction of the second direction D2, and perpendicular to the rotating surface of the actuating member 55.

The second resilient member 57 may be a torsion spring. The second resilient member 57 is fixed on the post 535 of the locking member 53, with one end pressing the locking member 53 and the other end resisting against the first paw 359 of the fixing member 35, to prevent the locking portion 533 from withdrawing back from the through hole 311.

In assembly, first, the positioning posts 365 are passed through the positioning holes 551 of the corresponding positioning portion 552 rotatably connecting the actuating member 55 on the chassis platform 363 of the fixing member 35. Therefore, the contacting surface between the actuating member 55 and the fixing member 35 is reduced. Then, the claws 559 are inserted into the corresponding sliding slots 367 from the corresponding entrances 368 and hook onto the fixing member 35, thereby, preventing the actuating member 55 from disengaging with the fixing member 35, when the actuating member 55 rotates with respect to the fixing member 35.

Second, the locking member 53 is pivotally attached on the fixing member 35, and engages with the actuating member 55. The shaft 531 is fixed on the positioning block 355 of the fixing member 35, and rotatable with respect to the positioning block 355. The driven portion 537 are located on the driving surface 5573 of the driving portion 5571, the locking portion 533 is passes through the opening 353, and the post 535 contacts with the stopping block 357.

Third, a screw or a bolt pass through the fastening hole 5111 of hook 51 and mounting hole 352 of the fixing member 35 to fix the hook 51 on the fixing member 35, therefore, the hooking portion 513 is aligned with the locking portion 533. After that, the first end 591 of the first resilient member 59 is fixed on the post 553, the second end 592 is fixed on the second paw 361, and the winding 593 is in a normal state. The second resilient member 57 is fixed on the post 535 of the locking member 53, with one end pressing on the locking member 53 and the other end resisting against the first paw 359 of the fixing member 35, to prevent the locking portion 533 from withdrawing back from the through hole 311.

Finally, the fixing posts 315 pass through the fixing holes 3511 of the dampening members 351 to attach the fixing member 35 on the platform cover 31, and the hooking portion 513 of the hook 51 and the locking portion 533 of the locking member 53 pass through the through hole 311 for inserting into the locking slot 14. And the support cover 33 is engaged on the platform cover 31 with the actuating portion 555 passing through the corresponding pushing slot 331. Then the button 558 sleeves on the actuating portion 555 to be conveniently pushed, thereby actuating the locking member 53.

Figure 6:
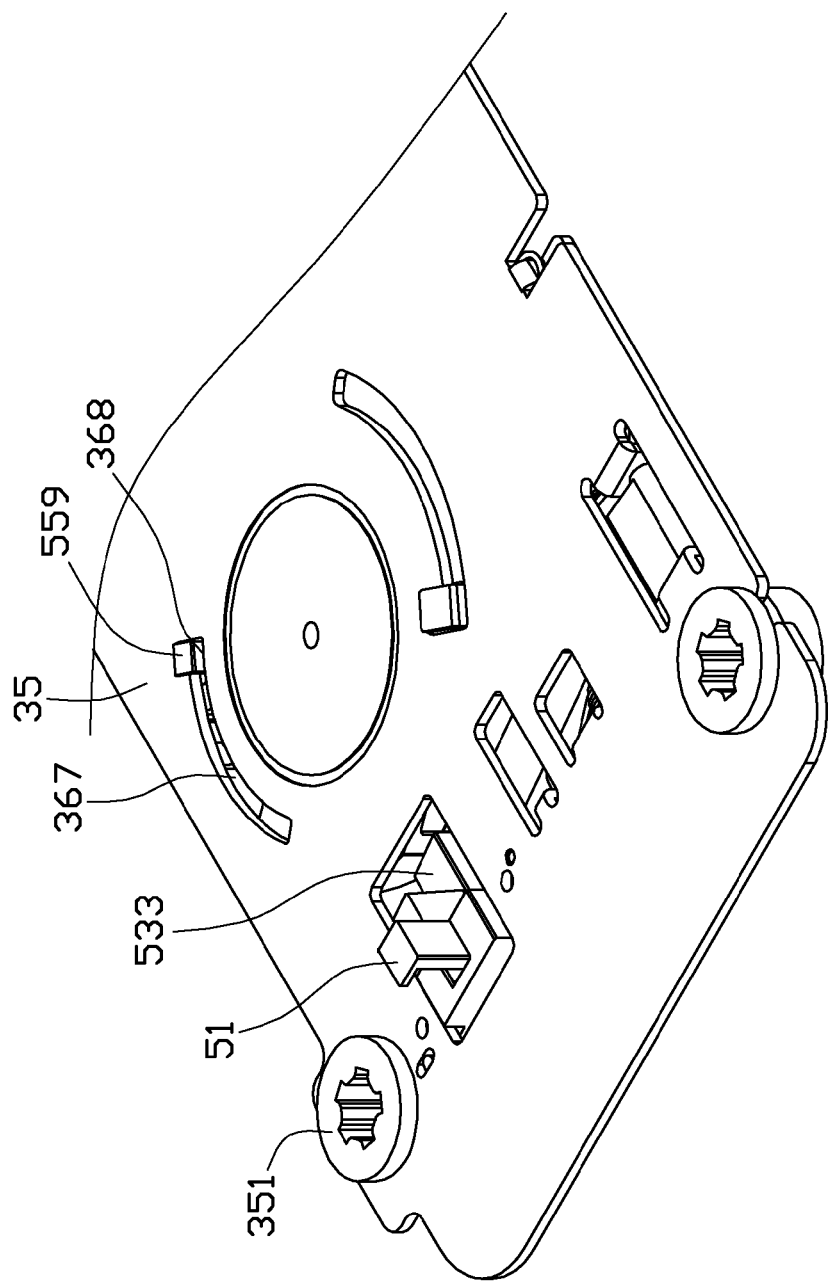
FIG. 6 is a reverse isometric view of FIG. 5.

Further referring to FIGS. 5 and 6, the locking portion 533 is withdrawn from the locking slot 14 of the electronic device 10 and the through hole 311 of the platform cover 31 along the first direction D1. The driven portion 537 is supported at the highest position of the driving portion 5571 with respect to the rotating surface of the actuating member 55. Each claw 559 is located at one end of the sliding slot 367, and the first resilient member 59 applies a first torsional force to one end of the positioning portion 552 of the actuating member 55 to limit the actuating member 55.

Figure 7:
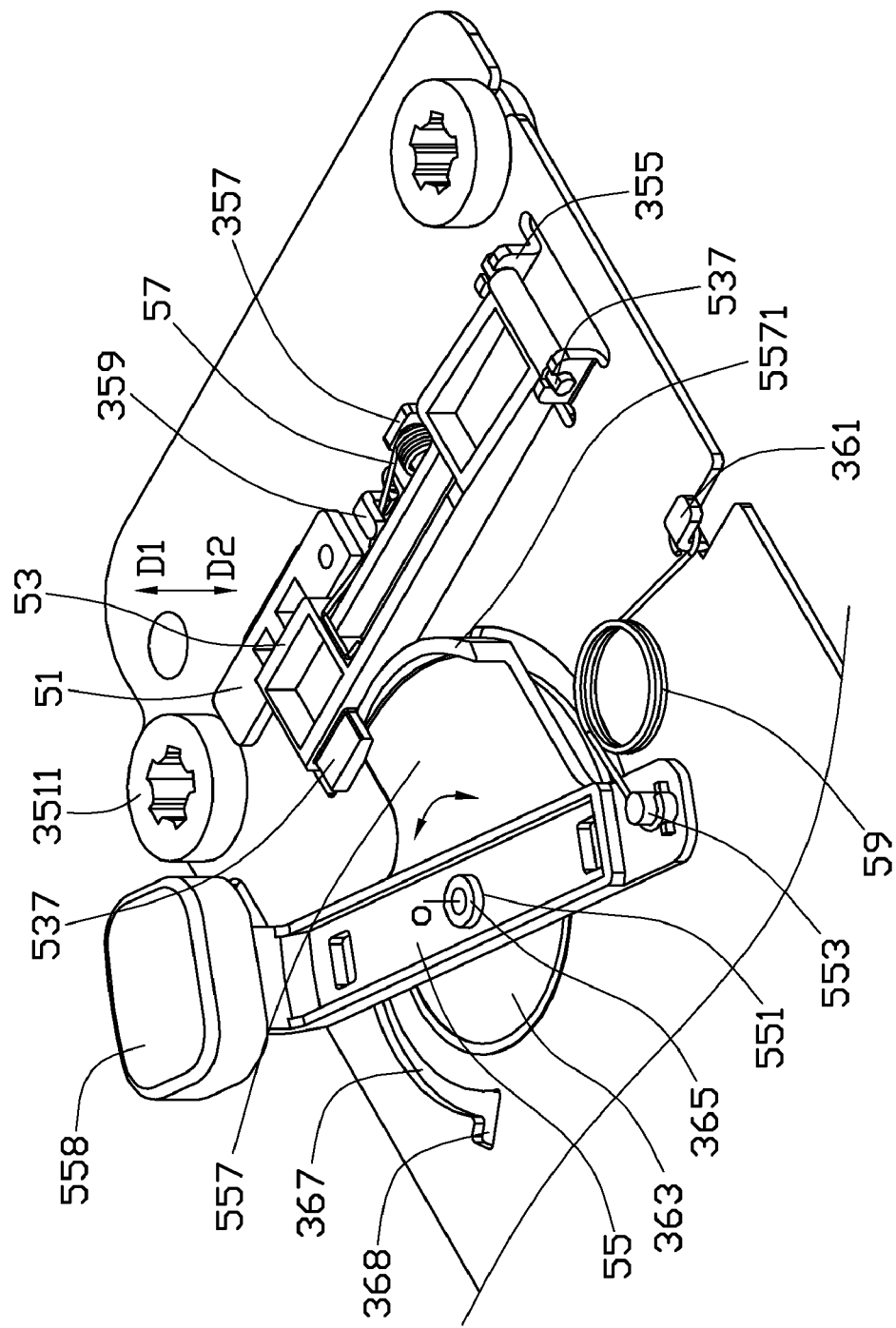
FIG. 7 is an isometric view of FIG. 5, with the actuating member rotated.
Figure 8:
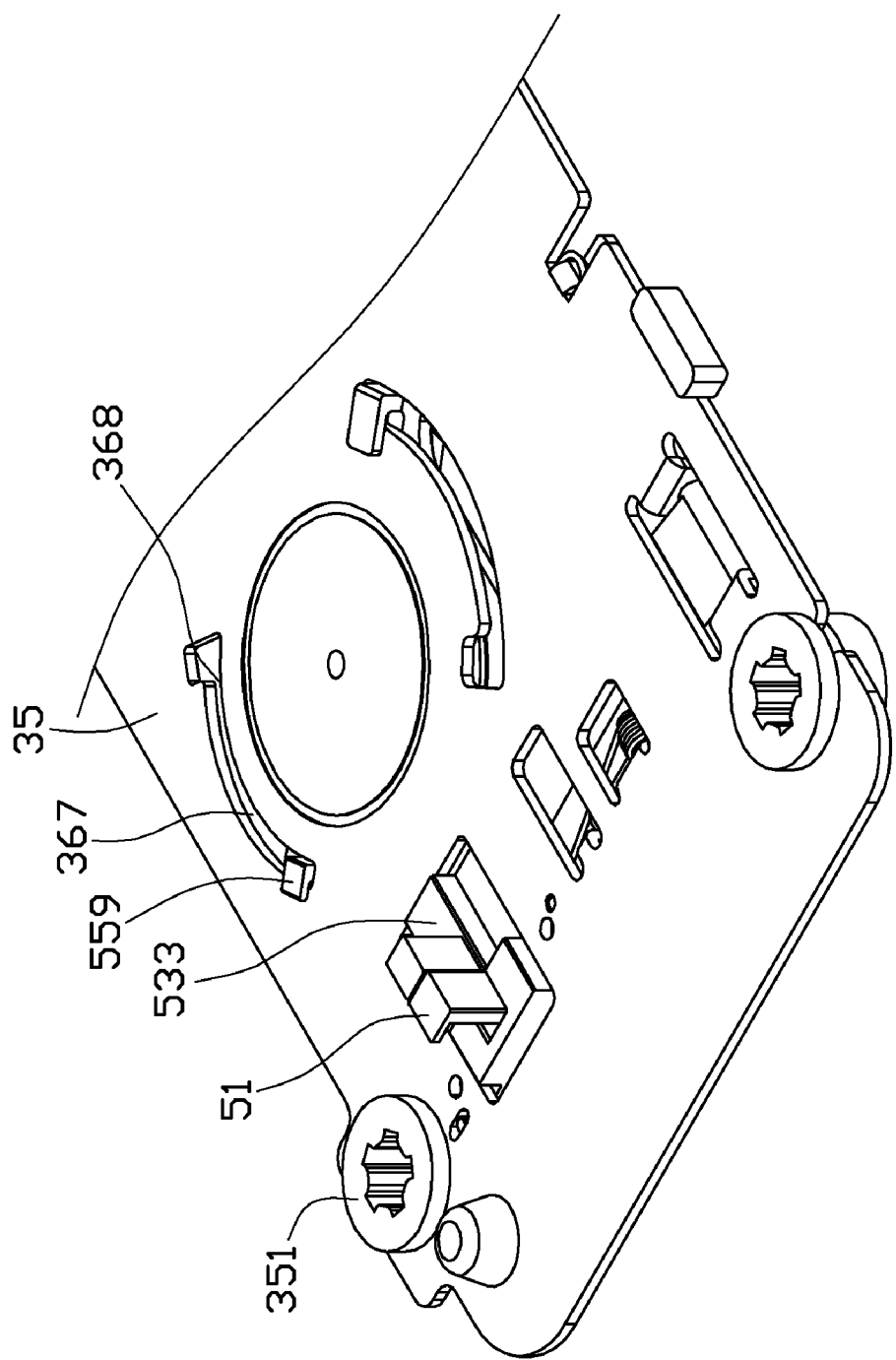
FIG. 8 is a reverse isometric view of FIG. 7.

Referring to FIGS. 7 and 8, when the electronic device 10 needs to be assembled on the fastening device 20, the hooking portion 51 is inserted into the corresponding locking slot 14. Then, the button 558 is pushed, overcoming the first torsional force of the first resilient member 59, and slides into the other end of the pushing slot 331. The actuating member 55 rotates around the positioning post 365 on the rotating surface with respect to the fixing member 35, and the claws 559 slide to the other end of the sliding slots 367 correspondingly. The first resilient member 59 applies a second torsional force to one end of the positioning portion 552 of the actuating member 55 to limit the actuating member 55. The driven portion 537 slides from the highest position to the lowest position of the driving portion 5571 due to a pressing force from the second resilient member 57. The locking portion 533 passes through the opening 353 and the through hole 311 and inserts into the locking slot 14 along the second direction D2 to prevent the hooking portion 51 from disengaging from the electronic device 10. Therefore, the electronic device 10 is assembled on the fastening device 20.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A fastening device for fastening an electronic device, comprising:
   a base board;
   a hook fixed on the base board and capable of inserting into the electronic device;
   a locking member attached on the base board and having a locking portion insertable into the electronic device, the locking member is rotatable in a first rotating plane;
   an actuating member attached on the base hoard and adjacent to the locking member, the actuating member is rotatable between a first position and a second position in a second rotating plane, which is perpendicular to the first rotating plane, the actuating member contacting with the locking member; and
   a resilient member comprising two ends and a winding connecting with the two ends, one of the two ends fixed on the actuating member, and the other one of the two ends fixed on the baseboard;
   wherein when the actuating member rotates from the first position to the second position and is positioned at the second position by a resilience force provided by the resilient member, the actuating member then pushes the locking member to rotate in the second plane to make the locking portion of the locking member insert into the electronic device to prevent the hook from disengaging with the electronic device.

2. The fastening device of claim 1, wherein the baseboard comprises a positioning post for pivotally fixing the actuating member.

3. The fastening device of claim 2, wherein the baseboard defines a curved sliding slot, the actuating member comprises a sliding portion slidably received in the sliding slot.

4. The fastening device of claim 3, wherein the base board comprises a fixing portion, one of the two ends of the resilient member is fixed on the fixing portion, the curved sliding slot is disposed between the positioning post and the fixing portion.

5. The rotatable system of claim 4, wherein the positioning post and the fixing portion are arranged in a line, and the line passes through the center of the curved sliding slot.

6. The fastening device of claim 3, wherein the base board comprises a fixing portion, one of the two ends of the resilient member is fixed on fixing portion, a line passes through the fixing portion, the positioning post, and the curved sliding slot successively.

7. The fastening device of claim 3, wherein the base board further defines an entrance communicating with the sliding slot.

8. The rotatable system of claim 7, wherein the entrance is defined at one end of the sliding slot.

9. The rotatable system of claim 1, wherein base board further comprises a platform which the actuating member is disposed on.

10. A rotatable system comprising:
    a base board;
    a rotating member pivotally attached on the base board, the rotating member capable of rotating around a rotating center, the rotating member comprising a driving portion with a height gradually decreased along a rotating direction, the driving portion configured for supporting a component which is rotatably attached on the rotating member; and
    a torsional spring capable of positioning the rotating member at a first position and a second position, the torsional spring comprising two ends and a winding connecting the two ends, the two ends fixed on the base board and the rotating member correspondingly;
    wherein the base board COM rises a positioning post arranged at the rotating center for pivotally fixing the rotating member, the component slides on the driving portion back and forth when the rotating member rotates between the first position and the second position.

11. The rotatable system of claim 10, wherein the base board defines a curved sliding slot, the rotating member comprises a sliding portion slidably received in the sliding slot.

12. The rotatable system of claim 11, wherein the base board comprises a fixing portion which one of the two ends of the torsional spring is fixed on, the curved sliding slot is disposed between the positioning post and the fixing portion.

13. The rotatable system of claim 12, wherein the positioning post and the fixing portion are arranged on a line, and the line passes through the center of the curved sliding slot.

14. The rotatable system of claim 13, wherein the base board further defines an entrance communicating with the sliding slot.

15. The rotatable system of claim 14, wherein the entrance is defined at one end of the sliding slot.

16. The rotatable system of claim 14, wherein base board further comprises a platform which the rotating member is disposed on, the positioning post is disposed on the platform.

17. Au apparatus, comprising:
a first device;
a second device capable of locking on the first device, the second device comprising
- a cover,
- a locking member attached on the cover and having a locking portion, the locking member is rotatable in a first rotating plane, the locking portion of the locking member capable of inserting into the first device and withdrawing from the first device,
- an actuating member attached on the cover, the actuating member is rotatable between a first position and a second position in a second rotating plane, which is perpendicular to the first rotating plane, the actuating member contacting with the locking member, and
- a torsional spring comprising two ends and a winding connecting with the two ends, one of the two ends fixed on the actuating member, and the other one of the two ends fixed on the cover;

wherein when the actuating member rotates from the first, position to the second position and is positioned at the second position by a resilience force provided by the torsional spring, the actuating member then pushes the locking member to rotate in the second plane to make the locking portion of the locking member insert into the first device to prevent the hook from disengaging with the electronic device.

18. The apparatus of claim 17, wherein the cover defines a curved sliding slot, the actuating member comprises a sliding portion slidably received in the sliding slot.

19. The apparatus of claim 18, wherein the cover comprises a positioning post arranged at the rotating center for pivotally fixing the actuating member and a fixing portion which one of the two ends of the torsional spring is fixed on, the curved sliding slot, is disposed between the positioning post and the fixing portion.

* * * * *